United States Patent
Lin et al.

(10) Patent No.: US 8,369,009 B2
(45) Date of Patent: Feb. 5, 2013

(54) NEAR INFRA-RED IMAGING LENS ASSEMBLY

(75) Inventors: Ming Ching Lin, Taichung (TW); Chien Pang Chang, Taichung (TW); Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 353 days.

(21) Appl. No.: 12/776,820

(22) Filed: May 10, 2010

(65) Prior Publication Data
US 2011/0069378 A1   Mar. 24, 2011

(30) Foreign Application Priority Data

Sep. 24, 2009 (TW) ................................. 98132246 A
Nov. 6, 2009 (TW) ................................. 98137719 A

(51) Int. Cl.
*G02B 13/14* (2006.01)
(52) U.S. Cl. ........................................ 359/356; 359/355
(58) Field of Classification Search .......... 359/350–361, 359/642
See application file for complete search history.

(56) References Cited

U.S. PATENT DOCUMENTS

| | | | | |
|---|---|---|---|---|
| 6,462,866 B1 * | 10/2002 | Sugiyama et al. | ............ | 359/359 |
| 7,436,605 B2 * | 10/2008 | Asami | ............ | 359/784 |
| 7,956,326 B1 * | 6/2011 | Kychakoff et al. | ...... | 250/339.01 |
| 2008/0100910 A1 * | 5/2008 | Kim et al. | ...... | 359/356 |
| 2009/0078873 A1 * | 3/2009 | Sakemoto et al. | ....... | 250/339.11 |

* cited by examiner

*Primary Examiner* — Thong Nguyen
(74) *Attorney, Agent, or Firm* — Morris, Manning & Martin, LLP; Tim Tingkang Xia, Esq.

(57) ABSTRACT

This invention provides an NIR imaging lens assembly comprising a lens element with refractive power made of a visible-light-absorbable material, and a filter or a filter film formed on one lens element with refractive power for filtering out infra-red light, wherein the number of lens elements with refractive power in the NIR imaging lens assembly is N, and wherein $N \geq 2$. The above lens arrangement allows light in a specific NIR wavelength range to pass through the lens assembly, thereby reducing interferences or influences from light in the other wavelength ranges. As a result, the resolution of the imaging lens assembly is improved, and its total track length is reduced effectively so that the entire lens system can be compact.

18 Claims, 13 Drawing Sheets

| TABLE 1 | | | | | |
|---|---|---|---|---|---|
| (Embodiment 1) | | | | | |
| f = 5.98 mm, Fno = 2.40, HFOV = 35.0 deg. | | | | | |
| Surface # | | Curvature Radius | Thickness | Material | Focal length |
| 0 | Object | Plano | Infinity | | |
| 1 | Lens 1 | 8.83650 (ASP) | 0.821 | Plastic | ARTON-D4532 | -10.39 |
| 2 | | 3.19870 (ASP) | 1.173 | | |
| 3 | Ape. Stop | Plano | 0.100 | | |
| 4 | Lens 2 | 16.88610 (ASP) | 1.495 | Plastic | ARTON-D4532 | 5.19 |
| 5 | | -3.02430 (ASP) | 2.417 | | |
| 6 | Lens 3 | -1.20529 (ASP) | 1.117 | Plastic | PC | -13.03 |
| 7 | | -1.92293 (ASP) | 0.100 | | |
| 8 | Lens 4 | 4.92000 (ASP) | 2.881 | Plastic | ARTON-D4532 | 7.81 |
| 9 | | -16.37110 (ASP) | 1.000 | | |
| 10 | Filter | Plano | 0.300 | Glass | BSC7 | - |
| 11 | | Plano | 0.500 | | |
| 12 | Cover-glass | Plano | 0.550 | Glass | BSC7 | - |
| 13 | | Plano | 2.413 | | |
| 14 | Image | Plano | | | |
| Note (1): Lens 3 is visible-light-absorbable material | | | | | |
| Note (2): Focal length (f) and refractive index are calculated based on a wavelength of 808nm | | | | | |

Fig.10

| TABLE 2 | | | | |
|---|---|---|---|---|
| Aspheric Coefficients | | | | |
| Surface # | 1 | 2 | 4 | 5 |
| k = | 8.36074E+00 | 2.71812E+00 | -1.00000E+02 | -7.34401E-02 |
| A4 = | 1.18313E-02 | 1.92525E-02 | 4.50234E-04 | -7.04488E-03 |
| A6 = | -1.46793E-03 | -1.68541E-03 | -1.39231E-03 | -4.42159E-04 |
| A8 = | 1.25175E-04 | 4.64962E-04 | -2.98979E-05 | -5.92076E-04 |
| A10= | -1.17308E-05 | -4.23029E-05 | -5.42666E-05 | 2.34912E-04 |
| A12= | | | 1.03026E-05 | -6.17464E-05 |
| A14= | | | | 4.46528E-06 |
| Surface # | 6 | 7 | 8 | 9 |
| k = | -1.56065E+00 | -8.10922E-01 | -1.96956E+00 | 4.90277E+00 |
| A4 = | -1.85714E-02 | 6.72122E-03 | -6.69642E-03 | -2.50694E-03 |
| A6 = | 3.88284E-03 | 4.31891E-04 | 9.76987E-04 | 4.82484E-04 |
| A8 = | -5.10545E-05 | 8.61734E-05 | -9.19532E-05 | -3.59697E-05 |
| A10= | | -1.15749E-06 | 4.72882E-06 | 1.26551E-06 |
| A12= | | -7.59067E-07 | -1.14017E-07 | -2.46550E-08 |
| A14= | | 6.66303E-08 | | |

Fig.11

| TABLE 3 | | | | | |
|---|---|---|---|---|---|
| (Embodiment 2) | | | | | |
| f = 5.98 mm, Fno = 2.40, HFOV = 35.0 deg. | | | | | |
| Surface # | | Curvature Radius | Thickness | Material | Focal length |
| 0 | Object | Plano | Infinity | | |
| 1 | Lens 1 | 8.83650 (ASP) | 0.821 | Plastic | ARTON-D4532 | -10.39 |
| 2 | | 3.19870 (ASP) | 1.173 | | |
| 3 | Ape. Stop | Plano | 0.100 | | |
| 4 | Lens 2 | 16.88610 (ASP) | 1.495 | Plastic | ARTON-D4532 | 5.19 |
| 5 | | -3.02430 (ASP) | 2.417 | | |
| 6 | Lens 3 | -1.20529 (ASP) | 1.117 | Plastic | PC | -13.03 |
| 7 | | -1.92293 (ASP) | 0.100 | | |
| 8 | Lens 4 | 4.92000 (ASP) | 2.881 | Plastic | ARTON-D4532 | 7.81 |
| 9 | | -16.37110 (ASP) | 1.000 | | |
| 12 | Cover-glass | Plano | 0.550 | Glass | BSC7 | - |
| 13 | | Plano | 3.112 | | |
| 14 | Image | Plano | | | |
| Note (1): The object-side surface of Lens 2 has filter film coated thereon on | | | | | |
| Note (2): Lens 3 is visible-light -absorbable material | | | | | |
| Note (3): Focal length (f) and refractive index are calculated based on a wavelength of 808nm | | | | | |

Fig.12

| TABLE 4 | | | | |
|---|---|---|---|---|
| Aspheric Coefficients | | | | |
| Surface # | 1 | 2 | 4 | 5 |
| k = | 8.36074E+00 | 2.71812E+00 | -1.00000E+02 | -7.34401E-02 |
| A4 = | 1.18313E-02 | 1.92525E-02 | 4.50234E-04 | -7.04488E-03 |
| A6 = | -1.46793E-03 | -1.68541E-03 | -1.39231E-03 | -4.42159E-04 |
| A8 = | 1.25175E-04 | 4.64962E-04 | -2.98979E-05 | -5.92076E-04 |
| A10= | -1.17308E-05 | -4.23029E-05 | -5.42666E-05 | 2.34912E-04 |
| A12= | | | 1.03026E-05 | -6.17464E-05 |
| A14= | | | | 4.46528E-06 |
| Surface # | 6 | 7 | 8 | 9 |
| k = | -1.56065E+00 | -8.10922E-01 | -1.96956E+00 | 4.90277E+00 |
| A4 = | -1.85714E-02 | 6.72122E-03 | -6.69642E-03 | -2.50694E-03 |
| A6 = | 3.88284E-03 | 4.31891E-04 | 9.76987E-04 | 4.82484E-04 |
| A8 = | -5.10545E-05 | 8.61734E-05 | -9.19532E-05 | -3.59697E-05 |
| A10= | | -1.15749E-06 | 4.72882E-06 | 1.26551E-06 |
| A12= | | -7.59067E-07 | -1.14017E-07 | -2.46550E-08 |
| A14= | | 6.66303E-08 | | |

Fig.13

NEAR INFRA-RED IMAGING LENS ASSEMBLY

BACKGROUND OF THE INVENTION

1. Field of the Invention

The present invention relates to a near infrared (NIR) imaging lens assembly, and more particularly, to an NIR imaging lens assembly which is applied to an electronic product.

2. Description of the Prior Art

The wavelength range of visible light is generally between 400 and 700 nm.

Infrared light has a wavelength range between 700 and $10^6$ nm and is not detectable with the naked eye, wherein the region from about 700 to 2000 nm is called the NIR wavelength range. Since NIR light has advantages of being less likely to be affected by interferences, lower cost and power consumption, and being highly secretive (less likely to be recognized with the naked eye), it is applied in many electronic technologies to develop various electronic products, such as remote control devices, infrared monitors and infrared detector systems. Also, as interactive video games are getting popular in recent years, more and more video game products with interactive detection features can be found on the market; NIR imaging technology may be used in those products to detect movements of the player, thereby achieving the interactive entertainment features.

Typically, a filter is added into an NIR imaging assembly to prevent light in the other wavelength ranges from interfering the response of the system. With the use of a filter, only light in a desirable wavelength range can pass through the system, while light in the other wavelength ranges is cut off. However, a filter that can concurrently cut off light near both the longer and shorter wavelength ends of a desirable region requires a more complex manufacturing process. Moreover, such a filter generally has a greater thickness, which tends to increase the total track length of the system as well as its production cost.

SUMMARY OF THE INVENTION

The present invention provides an NIR imaging lens assembly comprising a lens element with refractive power made of a substantially visible-light-absorbable material, and a filter for cutting off infrared light, wherein the number of lens elements having refractive power in the NIR imaging lens assembly is N, and wherein N≧2.

The above lens arrangement allows light in a specific NIR wavelength range to pass through the lens assembly, thereby reducing interferences or influences from light in other wavelength ranges. As a result, the resolution of the imaging system of the assembly is improved, and its total track length is reduced effectively so that the entire lens system can be compact.

In the aforementioned NIR imaging lens assembly, the lens element with refractive power made of a visible-light-absorbable material is used for absorbing light in the visible light wavelength range (i.e., light near the shorter-wavelength end of the NIR region) so as to reduce the interference from light in the visible light wavelength range; consequently, response of an electronic photo sensor of the lens assembly will improve. Moreover, as the aforementioned lens element itself has refractive power, it is used directly for refracting light and further helps the lens system to render images; consequently, the total track length of the lens system can be reduced effectively.

In the aforementioned NIR imaging lens assembly, the filter is used for cutting off light which has a longer wavelength in the infrared wavelength range (i.e., light near the longer-wavelength end of the NIR region) so as to reduce the interference from light in the infrared wavelength range; consequently, the response of the electronic photo sensor of the lens assembly will improve. Moreover, since the lens element with refractive power made of a visible-light-absorbable material cuts off light near the shorter-wavelength end of the NIR region while the filter cuts off light near the longer-wavelength end of the NIR region, light in a specific NIR wavelength range is allowed to pass through the lens assembly. This helps to effectively reduce interferences from light in the other wavelength ranges; consequently, the response of the electronic photo sensor of the lens assembly will improve.

Furthermore, the present invention provides an NIR imaging lens assembly comprising a lens element having refractive power made of a visible-light-absorbable material and a filter film formed on one lens element having refractive power in the NIR imaging lens assembly for cutting off infrared light, wherein the number of lens elements having refractive power in the NIR imaging lens assembly is N, and N≧2.

In the aforementioned NIR imaging lens assembly, the lens element having refractive power with the filter film formed thereon is used for cutting off light which has a longer wavelength in the infrared wavelength range (i.e., light near the longer-wavelength end of the NIR region) so as to reduce the interference from light in said wavelength range; consequently, response of an electronic photo sensor of the lens assembly will improve. Moreover, since the filter film is formed directly on one lens element with refractive power, the total length of the NIR imaging lens assembly and the complexity of the assembly process can be reduced accordingly.

BRIEF DESCRIPTION OF THE DRAWINGS

FIG. 10 is TABLE 1 which lists the optical data of the first embodiment.

FIG. 11 is TABLE 2 which lists the aspheric surface data of the first embodiment.

FIG. 12 is TABLE 3 which lists the optical data of the second embodiment.

FIG. 13 is TABLE 4 which lists the aspheric surface data of the second embodiment.

DETAILED DESCRIPTION OF THE PREFERRED EMBODIMENTS

Figure 1:
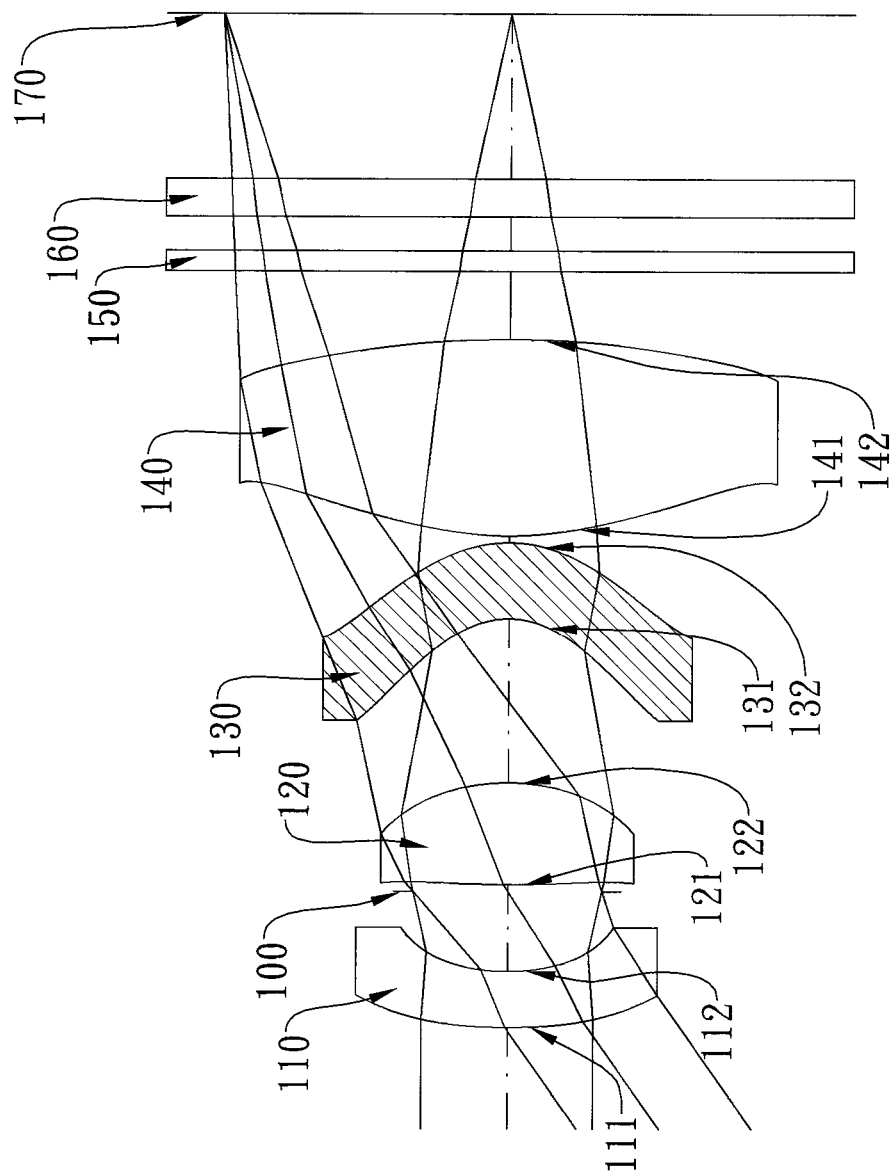
FIG. 1 shows an NIR imaging lens assembly in accordance with a first embodiment of the present invention.

The present invention provides an NIR imaging lens assembly comprising a lens element having refractive power made of a substantially visible-light-absorbable material and a filter for cutting off infrared light, wherein the number of lens elements having refractive power in the NIR imaging lens assembly is N, and wherein N≧2. A preferred example would satisfy the relation: N≦8, which helps reduce the total track length of the entire lens system, the complexity of the assembly process, and the production cost.

In the aforementioned NIR imaging lens assembly, the lens element having refractive power made of a visible-light-absorbable material has an average transmittance percentage of TA_S for light in the wavelength range of 400 to 600 nm and TA_L for light in the wavelength range of 900 to 1050 nm. Preferably, TA_S and TA_L satisfy the following relations: TA_S<20%, and TA_L>60%. When the aforementioned relations are satisfied, the NIR imaging lens assembly effectively absorbs light in the visible light wavelength range and allows light in the infrared wavelength range to pass through the lens assembly. As a result, the interference from light in the visible light wavelength range is effectively reduced.

In the aforementioned NIR imaging lens assembly, the filter has an average transmittance percentage of TF_S for light in the wavelength range of 400 to 600 nm and TF_L for light in the wavelength range of 900 to 1050 nm. Preferably, TF_S and TF_L satisfy the following relations: TF_S>40%, and TF_L<20%. When the aforementioned relations are satisfied, the NIR imaging lens assembly effectively cuts off light which has a longer wavelength in the infrared wavelength range. By having the lens element with refractive power made of a visible-light-absorbable material, it can filter out the light near both the shorter and longer wavelength ends of the NIR region. As a result, light being retained in a specific NIR wavelength range is allowed to pass through the lens assembly. This helps to effectively reduce interferences from light in the other wavelength ranges; consequently, the response of the electronic photo sensor of the lens assembly will improve.

In the aforementioned NIR imaging lens assembly, the lens element with refractive power made of a visible-light-absorbable material may be made of plastic or glass. Preferably, all lens elements having refractive power in the NIR imaging lens assembly are made of plastic or glass, and preferably, the lens assembly at least comprises an aspheric lens element so as to enhance the correction of aberrations of the lens system.

In the aforementioned NIR imaging lens assembly, half of the maximum field of view of the NIR imaging lens assembly is HFOV, and a maximum angle of incidence of a chief ray on an electronic photo sensor of the NIR imaging lens assembly is CRA (also a maximum angle between the chief ray and the normal of the electronic photo sensor in the NIR imaging lens assembly). Preferably, HFOV and CRA satisfy the following relation: 1.0<HFOV/CRA<12.0. When the aforementioned relation is satisfied, a desirable field of view of the NIR imaging lens assembly can be effectively maintained, and the angle of incidence on the electronic photo sensor is reduced. As a result, the photosensitivity of the electronic photo sensor is improved. Furthermore, HFOV and CRA preferably satisfy the following relation: 2.0<HFOV/CRA<6.0.

In the aforementioned NIR imaging lens assembly, its transmittance spectrum has a peak, a corresponding center wavelength of the peak is CW, and a corresponding maximum transmittance percentage of the peak is MT. Preferably, CW and MT satisfy the following relations: 780 nm<CW<900 nm, and MT≧50%. When the aforementioned relations are satisfied, incident light on the electronic photo sensor of the NIR imaging lens assembly can be effectively limited to light in the NIR wavelength range. As a result, interferences from light in the other wavelength ranges are effectively avoided, and the response of the electronic photo sensor will improve.

In the aforementioned NIR imaging lens assembly, its transmittance spectrum has a peak, a corresponding full width at half maximum of the peak is FWHM, and a corresponding maximum transmittance percentage of the peak is MT. Preferably, FWHM and MT satisfy the following relations: 3 nm<FWHM<25 nm, and MT≧50%. When the aforementioned relations are satisfied, it ensures that light in a desirable wavelength range passes through the NIR imaging lens assembly, interferences from light in the other wavelength ranges are effectively avoided, and the response of the electronic photo sensor will improve.

In the aforementioned NIR imaging lens assembly, an electronic photo sensor on the image plane is provided for image formation of an object, and a total track length of the NIR imaging lens assembly is TTL. Also, TTL is the distance near the optical axis between the electronic photo sensor and the object-side surface of the lens element having refractive power and closest to an imaged object. A maximum image height of the NIR imaging lens assembly is ImgH. Also, ImgH is defined as half of the diagonal length of the effective pixel area on the electronic photo sensor. Preferably, TTL and ImgH satisfy the following relation: TTL/ImgH<5.0. When the aforementioned relation is satisfied, the entire NIR imaging lens assembly can be compact, in order to fit in a compact portable electronic device.

Preferably, the aforementioned NIR imaging lens assembly is a retrofocus lens system, and the lens element having refractive power and being closest to an imaged object has negative refractive power. Such arrangement will help to reduce the angle of incidence on the electronic photo sensor; consequently, the response of the electronic photo sensor will improve.

Moreover, the present invention provides an NIR imaging lens assembly comprising a lens element having refractive power made of a visible-light-absorbable material and a filter film formed on one lens element with refractive power in the NIR imaging lens assembly for cutting off infrared light, wherein the number of lens elements having refractive power in the NIR imaging lens assembly is N, and N≧2.

In the aforementioned NIR imaging lens assembly, the lens element with refractive power made of a visible-light-absorbable material has an average transmittance percentage of TA_S for light in the wavelength range of 400 to 600 nm and TA_L for light in the wavelength range of 900 to 1050 nm. Preferably, TA_S and TA_L satisfy the following relations: TA_S<20%, and TA_L>60%. When the aforementioned relations are satisfied, the NIR imaging lens assembly effectively absorbs light in the visible light wavelength range and allows light in the infrared wavelength range to pass through the lens assembly. As a result, the interference from light in the visible light wavelength range is effectively reduced.

In the aforementioned NIR imaging lens assembly, the lens element having refractive power with the filter film formed thereon has an average transmittance percentage of TC_S for light in the wavelength range of 400 to 600 nm and TC_L for light in the wavelength range of 900 to 1050 nm. Preferably, TC_S and TC_L satisfy the following relations: TC_S>40%, and TC_L<20%. When the aforementioned relations are satisfied, the NIR imaging lens assembly effectively cuts off light which has a longer wavelength in the infrared wavelength range. Through both the lens element having refractive power made of a visible-light-absorbable material and the lens element having refractive power with the filter film formed thereon, light near both the shorter and longer wavelength ends of the NIR region can be cut off. As a result, only light in a specific NIR wavelength range is allowed to pass through the lens assembly. This helps to effectively reduce interferences from light in the other wavelength ranges; consequently, the response of the electronic photo sensor of the lens assembly will improve.

In the aforementioned NIR imaging lens assembly, preferably, the lens element having refractive power and made of a visible-light-absorbable material in the aforementioned NIR imaging lens assembly is made of plastic, and preferably, the lens assembly at least comprises an aspheric lens element to enhance the correction of aberrations of the lens system.

In the aforementioned NIR imaging lens assembly, half of the maximum field of view of the NIR imaging lens assembly is HFOV, and a maximum angle of incidence of a chief ray on an electronic photo sensor of the NIR imaging lens assembly is CRA. Preferably, HFOV and CRA satisfy the following relation: 1.0<HFOV/CRA<12.0. When the aforementioned relation is satisfied, a desirable field of view of the NIR imaging lens assembly can be effectively maintained, and the angle of incidence on the electronic photo sensor is reduced. As a result, the photosensitivity of the electronic photo sensor is improved.

In the aforementioned NIR imaging lens assembly, its transmittance spectrum has a peak, a corresponding center wavelength of the peak is CW, and a corresponding maximum transmittance percentage of the peak is MT. Preferably, CW and MT satisfy the following relations: 780 nm<CW<900 nm, and MT≧50%. When the aforementioned relations are satisfied, incident light on the electronic photo sensor of the NIR imaging lens assembly can be effectively limited to light in the NIR wavelength range. As a result, interferences from light in the other wavelength ranges are effectively avoided, and the response of the electronic photo sensor will improve.

In the aforementioned NIR imaging lens assembly, its transmittance spectrum has a peak, a corresponding full width at half maximum of the peak is FWHM, and a corresponding maximum transmittance percentage of the peak is MT. Preferably, FWHM and MT satisfy the following relations: 3 nm<FWHM<25 nm, and MT≧50%. When the aforementioned relations are satisfied, it ensures that light in a desirable wavelength range passes through the NIR imaging lens assembly. As a result, interferences from light in the other wavelength ranges are effectively avoided, and the response of the electronic photo sensor will improve.

In the aforementioned NIR imaging lens assembly, an electronic photo sensor on the image plane is provided for image formation of an object, a total track length of the NIR imaging lens assembly is TTL, and a maximum image height of the NIR imaging lens assembly is ImgH. Preferably, TTL and ImgH satisfy the following relation: TTL/ImgH<5.0. When the aforementioned relation is satisfied, the entire NIR imaging lens assembly can be compact, in order to fit in a compact portable electronic device.

Preferably, the aforementioned NIR imaging lens assembly is a retrofocus lens system, and the lens element with refractive power closest to an imaged object has negative refractive power. Such arrangement will help to reduce the angle of incidence on the electronic photo sensor; consequently, the response of the electronic photo sensor will improve.

In an NIR imaging lens assembly of the present invention, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the NIR imaging lens assembly can be reduced effectively.

In an NIR imaging lens assembly of the present invention, if a lens element has a convex surface, it means the portion of the surface in proximity of the axis is convex; if a lens element has a concave surface, it means the portion of the surface in proximity of the axis is concave.

Preferred embodiments of the present invention will be described in the following paragraphs by referring to the accompanying drawings.

Figure 2:
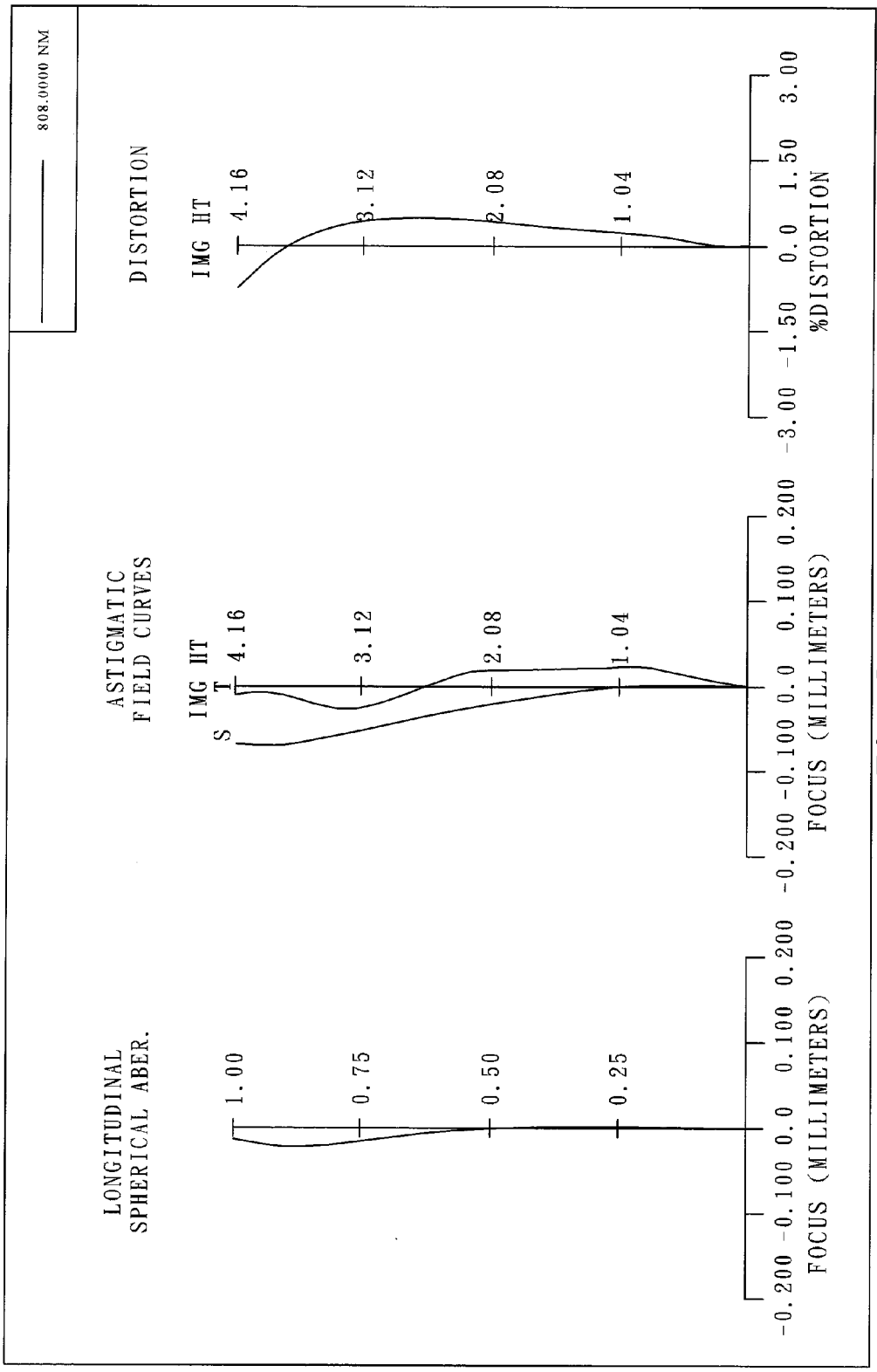
FIG. 2 shows the aberration curves of the first embodiment of the present invention.

FIG. 1 shows an NIR imaging lens assembly in accordance with a first embodiment of the present invention; FIG. 2 shows the aberration curves of the first embodiment of the present invention. The NIR imaging lens assembly of the first embodiment is a retrofocus system, in which the lens element closest to an imaged object (i.e., the first lens element) has negative refractive power. The NIR imaging lens assembly mainly comprises four lens elements, in order from the object side to the image side: a plastic first lens element 110 with negative refractive power, having a convex object-side surface 111 and a concave image-side surface 112, the object-side surface 111 and the image-side surface 112 both being aspheric; a plastic second lens element 120 with positive refractive power, having convex object-side and image-side surfaces 121 and 122, the object-side and image-side surfaces 121 and 122 both being aspheric; a plastic third lens element 130 with negative refractive power, having a concave object-side surface 131 and a convex image-side surface 132, the object-side surface 131 and the image-side surface 132 both being aspheric, and the material of the third lens element 130 being capable of absorbing visible light; a plastic fourth lens element 140 with positive refractive power, having convex object-side and image-side surfaces 141 and 142, the object-side and image-side surfaces 141 and 142 both being aspheric; and a stop 100 disposed between the first lens element 110 and the second lens element 120. The NIR imaging lens assembly further comprises a filter 150 disposed between the image-side surface 142 of the fourth lens element 140 and an image plane 170, and a cover glass 160 disposed between the filter 150 and the image plane 170; the filter 150 and the cover glass 160 have no influence on the focal length of the NIR imaging lens assembly. The image plane 170 is disposed behind the cover glass 160.

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

Figure 3:
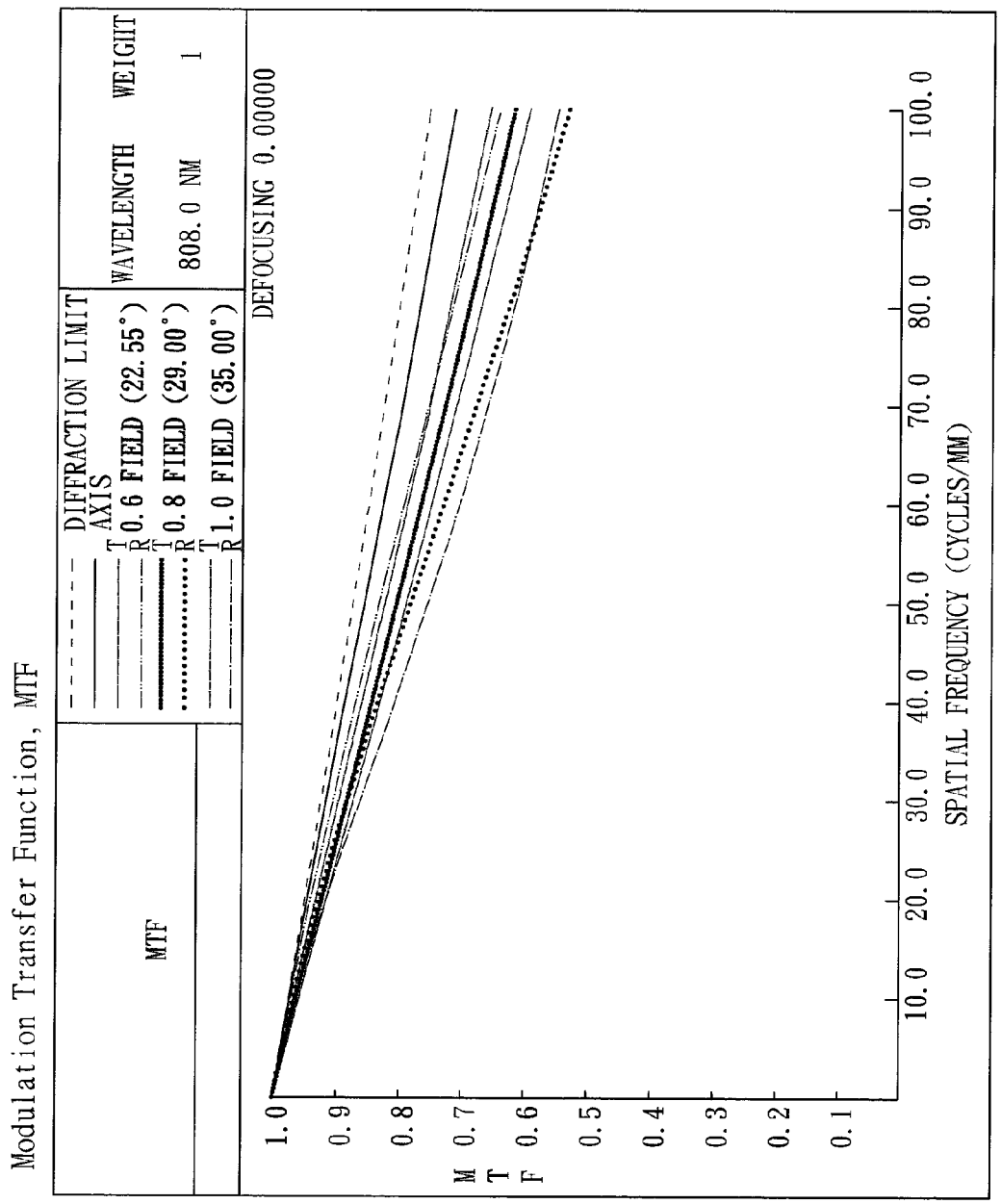
FIG. 3 shows a modulation transfer function (MTF) chart of the first embodiment of the present invention.

FIG. 3 is a modulation transfer function (MTF) chart of the first embodiment of the present invention. MTF is a lens evaluation tool commonly used to evaluate the ability of a lens system to transform the contrast from object space to image space measured at different spatial frequencies, thereby evaluating the resolution, contrast and sharpness performances of the lens system. In FIG. 3, the x-axis of the chart represents the spatial frequency at which a test is carried out, and the y-axis represents the corresponding MTF of the lens system at said spatial frequencies; a higher value on the curve means better resolution power of the lens system.

Figure 4:
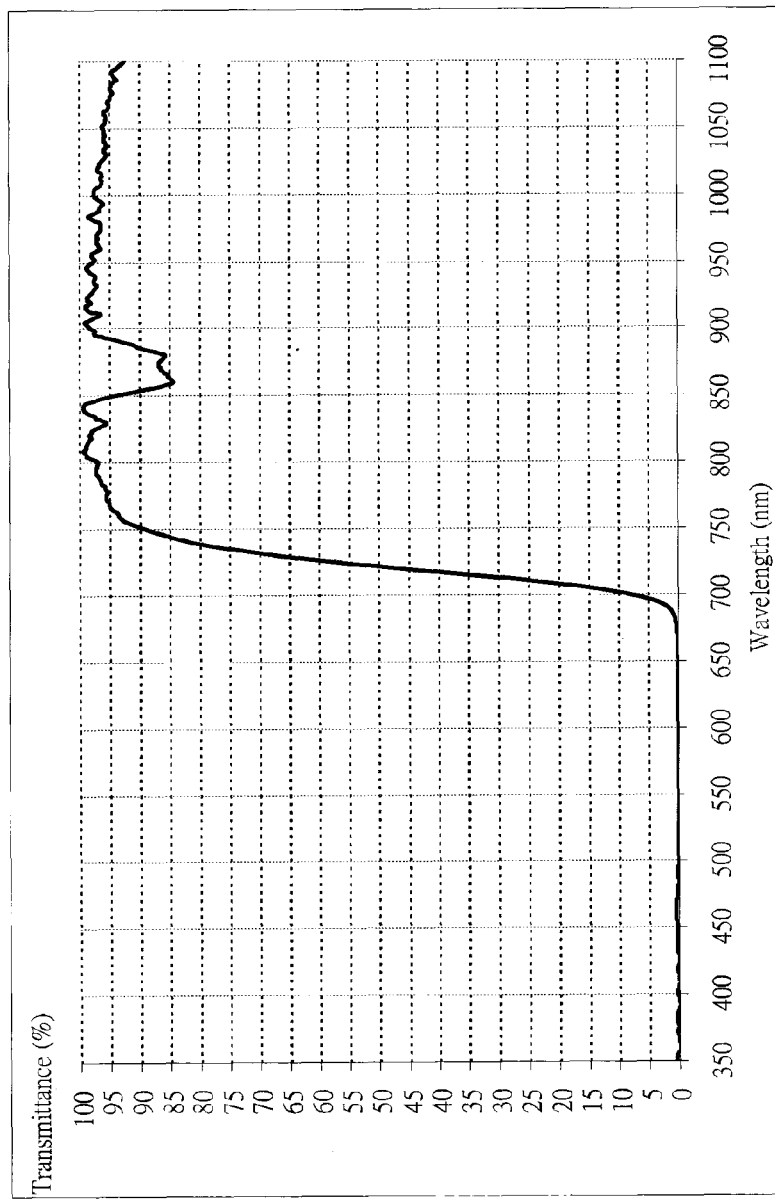
FIG. 4 shows the transmittance spectrum of the lens element having refractive power made of a visible-light-absorbable material (the third lens element) in the first embodiment of the present invention.
Figure 5:
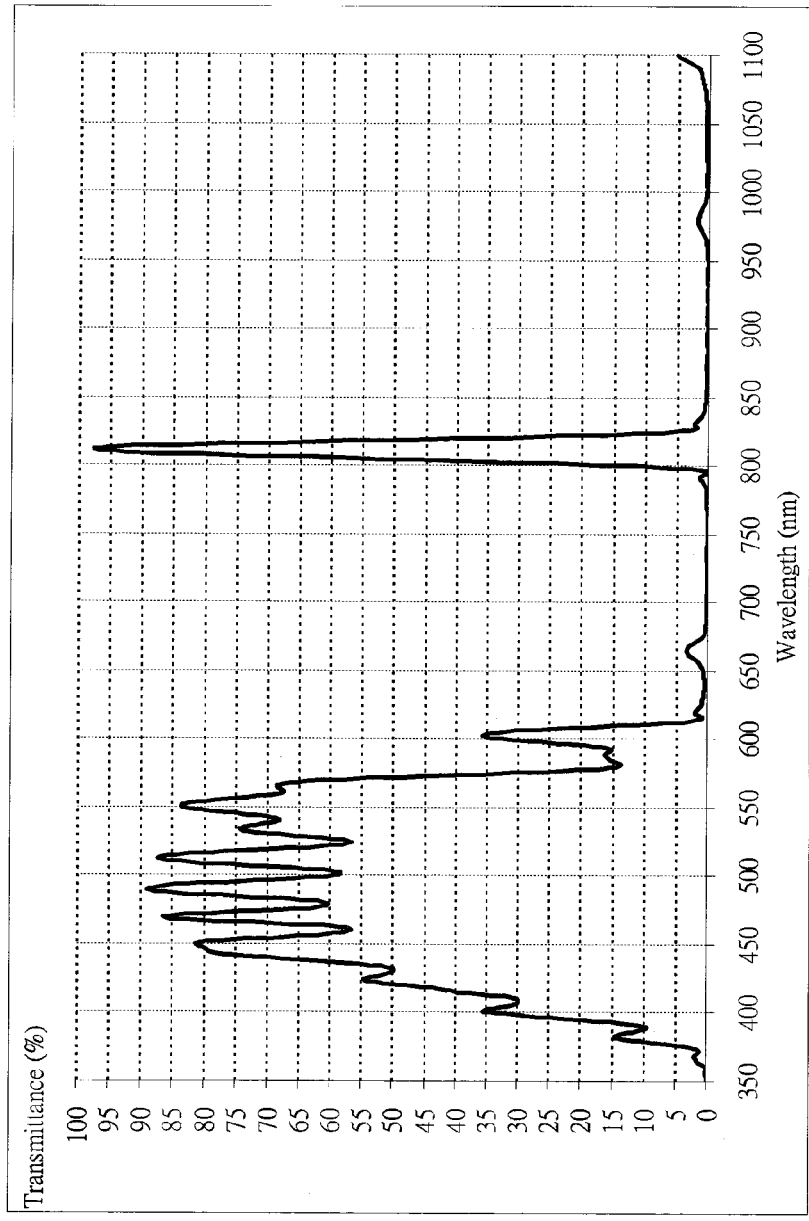
FIG. 5 shows the transmittance spectrum of the filter in the first embodiment of the present invention.
Figure 6:
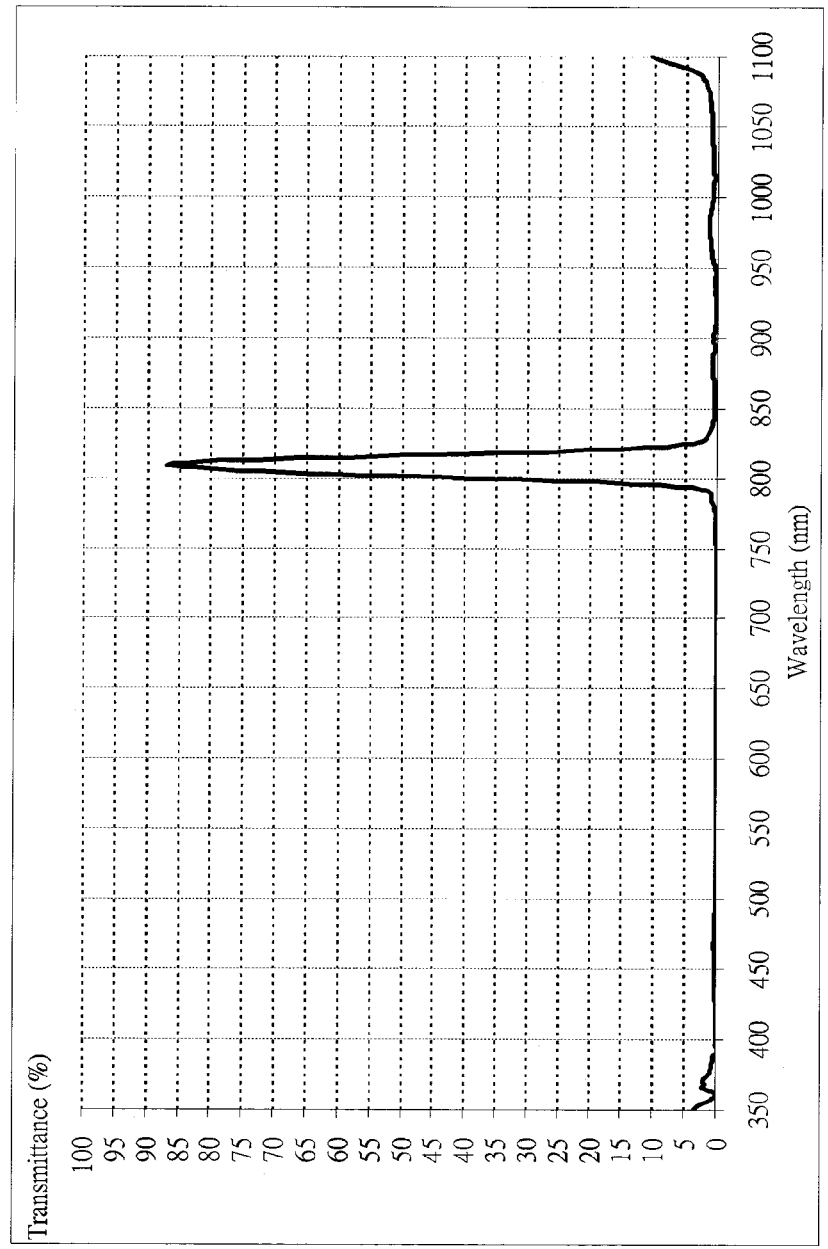
FIG. 6 shows the transmittance spectrum of the entire NIR imaging lens assembly in accordance with the first embodiment of the present invention.

FIG. 4 is the transmittance spectrum of the third lens element 130, which is made of a visible-light-absorbable material, in the first embodiment of the present invention. The x-axis of the chart represents the wavelength of the test light, and the y-axis represents the corresponding transmittance percentage of said lens element at said wavelength. As FIG. 4 shows, light in the visible light wavelength range (400 to 700 nm) is almost absorbed by the third lens element 130 made of a visible-light-absorbable material and cannot pass through said lens element. FIG. 5 is the transmittance spectrum of the filter 150 in the first embodiment; the x-axis of the chart represents the wavelength of the test light, and the y-axis represents the corresponding transmittance percentage of said filter at said wavelength. FIG. 6 is the transmittance spectrum of the entire NIR imaging lens assembly in the first embodiment; the x-axis of the chart represents the wavelength of the test light, and the y-axis represents the corresponding transmittance percentage of said assembly at said wavelength. As FIG. 6 shows, only light in a specific NIR wavelength range can pass through the entire NIR imaging lens assembly.

In the first embodiment of the present NIR imaging lens assembly, the focal length of the entire assembly is f, and it satisfies the relation: f=5.98.

In the first embodiment of the present NIR imaging lens assembly, the f-number of the entire assembly is Fno, and it satisfies the relation: Fno=2.40.

In the first embodiment of the present NIR imaging lens assembly, half of the field of view of the assembly is HFOV, and it satisfies the relation: HFOV=35.0 (degrees).

In the first embodiment of the present NIR imaging lens assembly, the third lens element 130 has an average transmittance percentage of TA_S for light in the wavelength range of 400 to 600 nm and TA_L for light in the wavelength range of 900 to 1050 nm; TA_S and TA_L satisfy the following relations: TA_S=0.1%, and TA_L=97.1%.

In the first embodiment of the present NIR imaging lens assembly, the filter 150 has an average transmittance percentage of TF_S for light in the wavelength range of 400 to 600 nm and TF_L for light in the wavelength range of 900 to 1050 nm; TF_S and TF_L satisfy the following relations: TF_S=59.1%, and TF_L=0.5%.

In the first embodiment of the present NIR imaging lens assembly, half of the maximum field of view of the assembly is HFOV, the maximum angle of incidence of a chief ray on an electronic photo sensor of the assembly is CRA; HFOV and CRA satisfy the following relation: HFOV/CRA=3.5.

In the first embodiment of the present NIR imaging lens assembly, the transmittance spectrum of the assembly has a peak, the corresponding full width at half maximum of the peak is FWHM, and the corresponding maximum transmittance percentage of the peak is MT; FWHM and MT satisfy the following relations: CW=808 (nm), FWHM=15.3 (nm), and MT=86.9%.

In the first embodiment of the present NIR imaging lens assembly, an electronic photo sensor on the image plane 170 is provided for image formation of an object. The total track length of the present NIR imaging lens assembly is TTL, and the maximum image height of the assembly is ImgH; TTL and ImgH satisfy the following relation: TTL/ImgH=3.57.

The detailed optical data of the first embodiment is shown in FIG. 10 (TABLE 1), and the aspheric surface data is shown in FIG. 11 (TABLE 2), wherein the units for the radius of curvature, the thickness and the focal length are expressed in mm, HFOV is half of the maximum field of view, and the focal lengths and refractive indexes of the first embodiment are calculated based on a wavelength of 808 nm.

Figure 7:
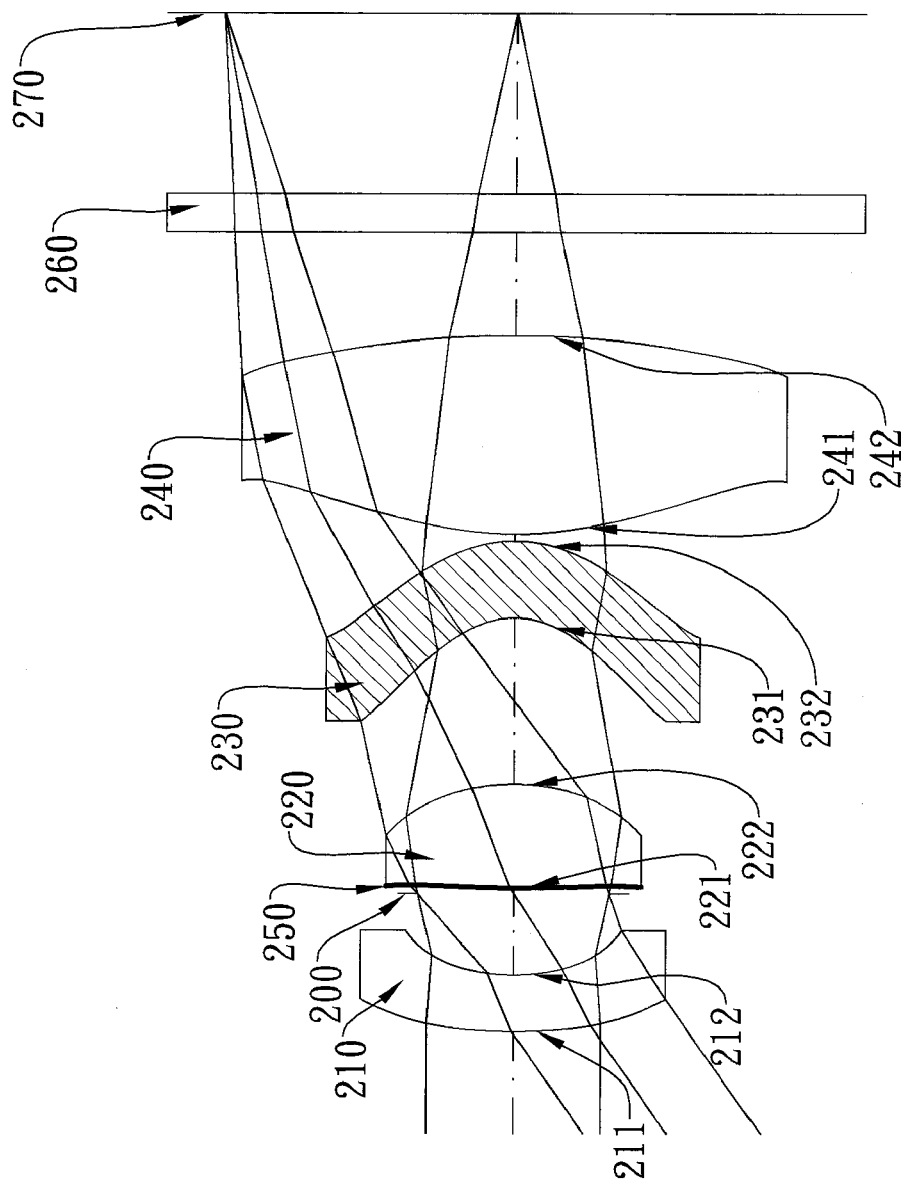
FIG. 7 shows an NIR imaging lens assembly in accordance with a second embodiment of the present invention.
Figure 8:
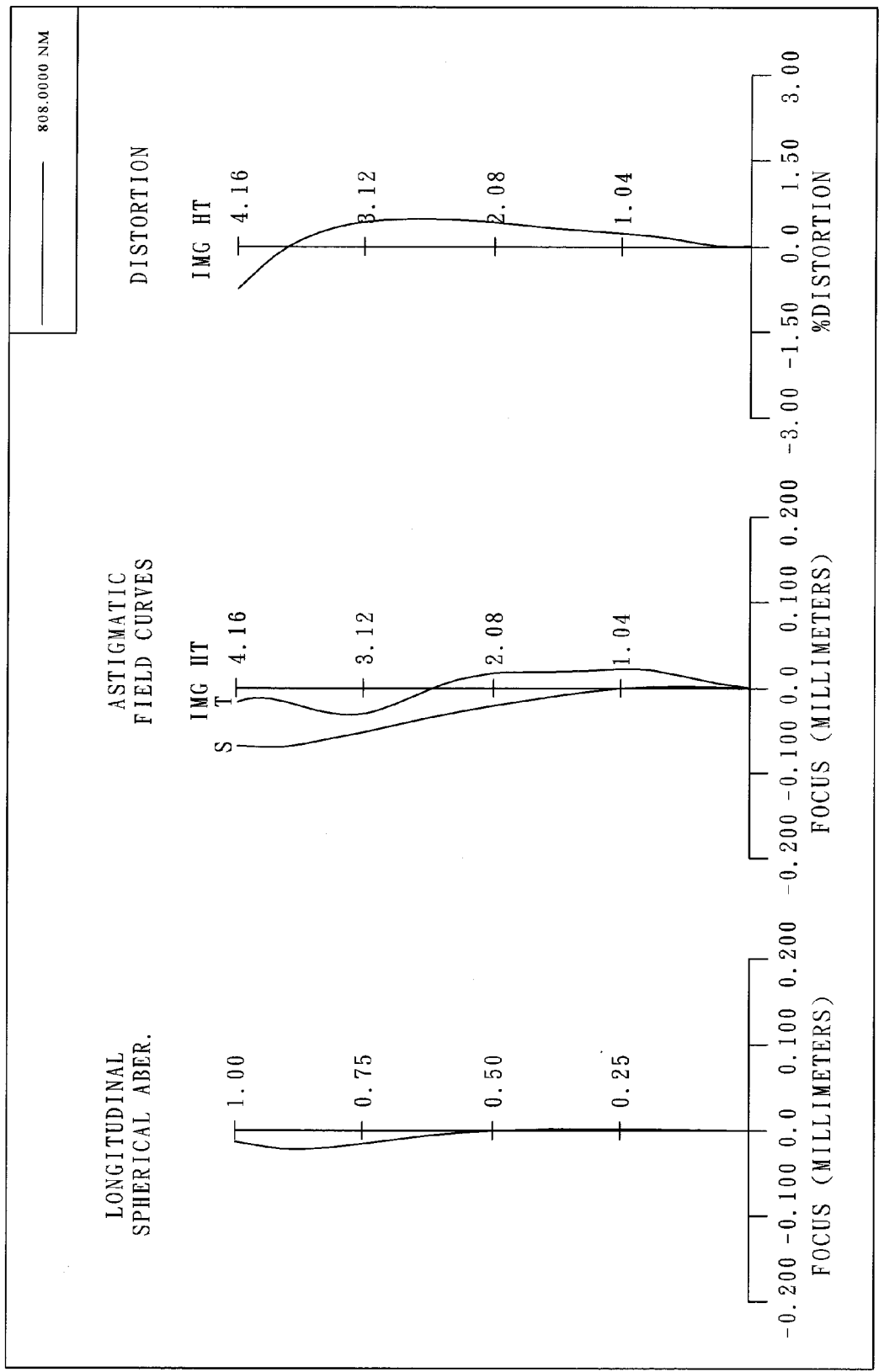
FIG. 8 shows the aberration curves of the second embodiment of the present invention.

FIG. 7 shows an NIR imaging lens assembly in accordance with a second embodiment of the present invention; FIG. 8 shows the aberration curves of the second embodiment of the present invention. The NIR imaging lens assembly of the second embodiment is a retrofocus system, in which the lens element closest to an imaged object (i.e., the first lens element) has negative refractive power. The NIR imaging lens assembly mainly comprises four lens elements, in order from the object side to the image side: a plastic first lens element 210 with negative refractive power, having a convex object-side surface 211 and a concave image-side surface 212, the object-side surface 211 and the image-side surface 212 both being aspheric; a plastic second lens element 220 with positive refractive power, having convex object-side and image-side surfaces 221 and 222, the object-side and image-side surfaces 221 and 222 both being aspheric, and the object-side surface 221 having a filter film 250 formed thereon for cutting off infrared light; a plastic third lens element 230 with negative refractive power, having a concave object-side surface 231 and a convex image-side surface 232, the object-side surface 231 and the image-side surface 232 both being aspheric, and the material of the third lens element 230 being capable of absorbing visible light; a plastic fourth lens element 240 with positive refractive power, having convex object-side and image-side surfaces 241 and 242, the object-side and image-side surfaces 241 and 242 both being aspheric; and a stop 200 disposed between the first lens element 210 and the second lens element 220. The NIR imaging lens assembly further comprises a cover glass 260 disposed between the image-side surface 242 of the fourth lens element 240 and an image plane 270; the cover glass 260 has no influence on the focal length of the NIR imaging lens assembly. The image plane 270 is disposed behind the cover glass 260.

The equation of the aspheric surface profiles of the second embodiment has the same form as that of the first embodiment.

Figure 9:
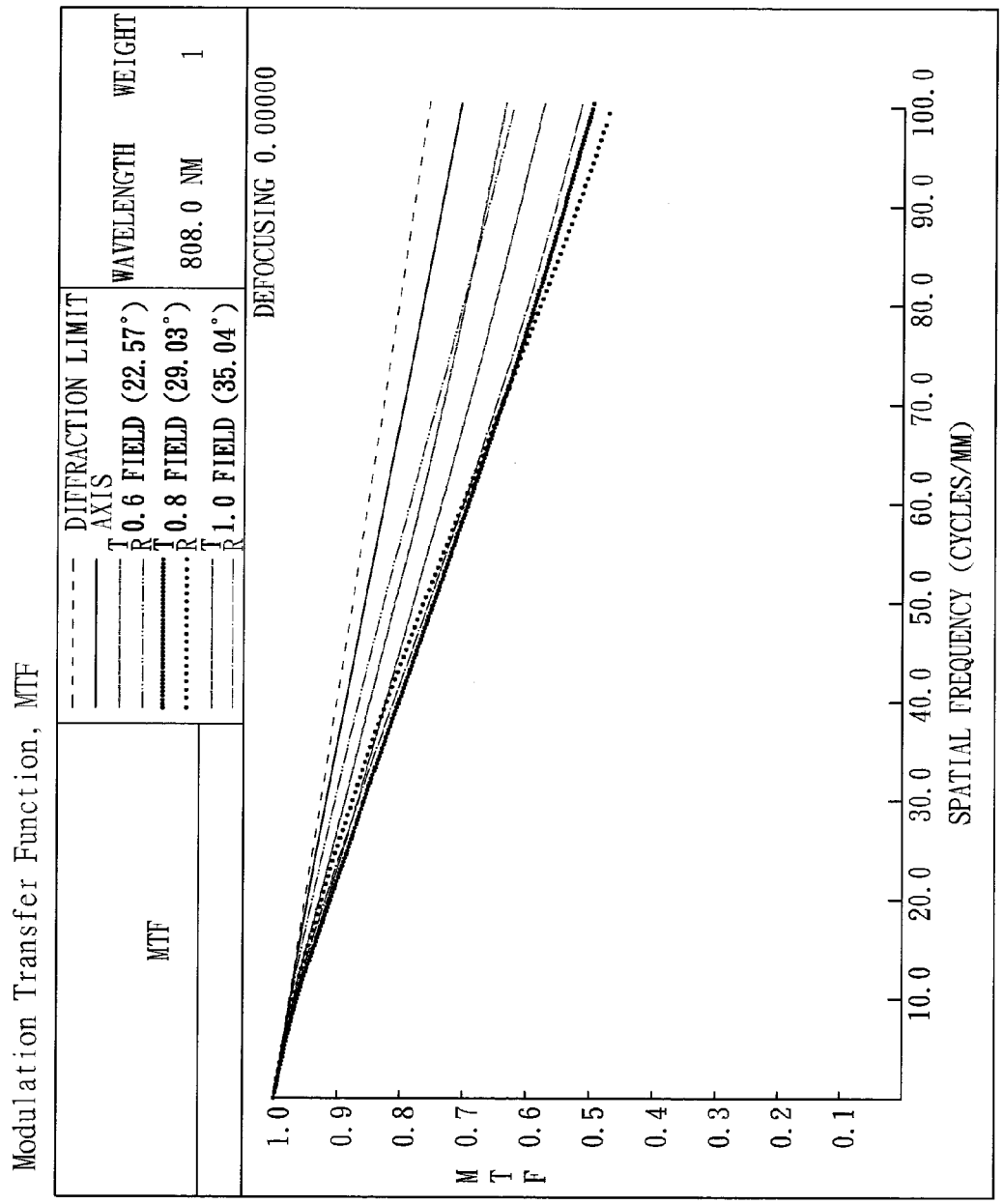
FIG. 9 shows a modulation transfer function (MTF) chart of the second embodiment of the present invention.

FIG. 9 is an MTF chart of the second embodiment of the present invention. MTF is a lens evaluation tool commonly used to evaluate the ability of a lens system to transform the contrast from object space to image space measured at different spatial frequencies, thereby evaluating the resolution, contrast and sharpness performances of the lens system. In FIG. 9, the x-axis of the chart represents the spatial frequency at which a test is carried out, and the y-axis represents the corresponding MTF of the lens system at said spatial frequencies; a higher value on the curve means better resolution power of the lens system.

In the second embodiment of the present NIR imaging lens assembly, the focal length of the entire assembly is f, and it satisfies the relation: f=5.98.

In the second embodiment of the present NIR imaging lens assembly, the f-number of the entire assembly is Fno, and it satisfies the relation: Fno=2.40.

In the second embodiment of the present NIR imaging lens assembly, half of the field of view of the assembly is HFOV, and it satisfies the relation: HFOV=35.0 (degrees).

In the second embodiment of the present NIR imaging lens assembly, the third lens element 230 has an average transmittance percentage of TA_S for light in the wavelength range of 400 to 600 nm and TA_L for light in the wavelength range of 900 to 1050 nm; TA_S and TA_L satisfy the following relations: TA_S=0.1%, and TA_L=97.1%.

In the second embodiment of the present NIR imaging lens assembly, half of the maximum field of view of the assembly is HFOV, the maximum angle of incidence of a chief ray on an electronic photo sensor of the assembly is CRA; HFOV and CRA satisfy the following relation: HFOV/CRA=3.5.

In the second embodiment of the present NIR imaging lens assembly, an electronic photo sensor on the image plane 270 is provided for image formation of an object. The total track length of the present NIR imaging lens assembly is TTL, and the maximum image height of the assembly is ImgH; TTL and ImgH satisfy the following relation: TTL/ImgH=3.55.

The detailed optical data of the second embodiment is shown in FIG. 12 (TABLE 3), and the aspheric surface data is shown in FIG. 13 (TABLE 4), wherein the units for the radius of curvature, the thickness and the focal length are expressed in mm, HFOV is half of the maximum field of view, and the focal lengths and refractive indexes of the second embodiment are calculated based on a wavelength of 808 nm.

In the second embodiment of the present NIR imaging lens assembly, the filter film 250 is formed on the object-side surface 221 of the second lens element 220. However, the position where the filter film 250 may be formed is not limited thereto. In an NIR imaging lens assembly of the present invention, the filter film may also be formed on the lens element with refractive power made of a visible-light-absorbable material, or on the other lens elements having refractive power.

The present invention provides an NIR imaging lens assembly, and with the lens arrangement described above, light in a specific NIR wavelength range is allowed to pass through the lens assembly, thereby reducing interferences or influences from light in the other wavelength ranges. As a result, the resolution of the imaging system of the assembly is improved, and its total track length is reduced effectively so that the entire lens system can be compact.

It is to be noted that TABLES 1-4 (illustrated in FIGS. 10-13 respectively) show different data of the different embodiments; however, any NIR imaging lens assembly of the same structure is considered to be within the scope of the present invention even if it uses different data. The preferred embodiments depicted above are exemplary and are not intended to limit the scope of the present invention.

What is claimed is:

1. A near infrared (NIR) imaging lens assembly comprising:
   a lens element with refractive power, made of a substantially visible-light-absorbable material; and
   a filter for filtering out infrared light;
   wherein the number of lens elements with refractive power in the NIR imaging lens assembly is N, the lens element with refractive power made of a substantially visible-light-absorbable material has an average transmittance percentage of TA_S for light in the wavelength range of 400 to 600 nm and TA_L for light in the wavelength range of 900 to 1050 nm, half of the maximum field of view of the NIR imaging lens assembly is HFOV, a maximum angle of incidence of a chief ray on an electronic photo sensor of the NIR imaging lens assembly is CRA, and satisfy the following relations:

$N \geq 2$, $TA\_S < 20\%$, $TA\_L > 60\%$, and $1.0 < HFOV/CRA < 12.0$.

2. The NIR imaging lens assembly according to claim 1, wherein the filter has an average transmittance percentage of TF_S for light in the wavelength range of 400 to 600 nm and TF_L for light in the wavelength range of 900 to 1050 nm, and TF_S and TF_L satisfy the following relations:

$TF\_S > 40\%$, and $TF\_L < 20\%$.

3. The NIR imaging lens assembly according to claim 2, wherein the lens element with refractive power made of a substantially visible-light-absorbable material is made of plastic or glass.

4. The NIR imaging lens assembly according to claim 3, wherein all of the lens elements with refractive power in the NIR imaging lens assembly are made of plastic or glass.

5. The NIR imaging lens assembly according to claim 4, wherein the NIR imaging lens assembly comprises at least an aspheric lens element.

6. The NIR imaging lens assembly according to claim 5, wherein half of the maximum field of view of the NIR imaging lens assembly is HFOV, a maximum angle of incidence of a chief ray on an electronic photo sensor of the NIR imaging lens assembly is CRA, and HFOV and CRA satisfy the following relation:

$2.0 < HFOV/CRA < 6.0$.

7. The NIR imaging lens assembly according to claim 2, wherein the transmittance spectrum of the NIR imaging lens assembly has a peak, a corresponding center wavelength of the peak is CW, a corresponding maximum transmittance percentage of the peak is MT, and CW and MT satisfy the following relations:

$780 \text{ nm} < CW < 900 \text{ nm}$, and $MT \geq 50\%$.

8. The NIR imaging lens assembly according to claim 2, wherein the transmittance spectrum of the NIR imaging lens assembly has a peak, a corresponding full width at half maximum of the peak is FWHM, a corresponding maximum transmittance percentage of the peak is MT, and FWHM and MT satisfy the following relations:

$3 \text{ nm} < FWHM < 25 \text{ nm}$, and $MT \geq 50\%$.

9. The NIR imaging lens assembly according to claim 2, wherein the number of lens elements with refractive power in the NIR imaging lens assembly is N, and $N \leq 8$.

10. The NIR imaging lens assembly according to claim 9, wherein the NIR imaging lens assembly is a retrofocus lens system, and the lens element having refractive power and being closest to an imaged object has negative refractive power.

11. The NIR imaging lens assembly according to claim 1, wherein an electronic photo sensor on an image plane is provided for image formation of an object, a total track length of the NIR imaging lens assembly is TTL, a maximum image height of the NIR imaging lens assembly is ImgH, and TTL and ImgH satisfy the following relation:

$TTL/ImgH < 5.0$.

12. A near infrared (NIR) imaging lens assembly comprising:
    a lens element with refractive power, made of a substantially visible-light-absorbable material; and a filter film formed on one lens element with refractive power in the NIR imaging lens assembly for filtering out infrared light;

wherein the number of lens elements with refractive power in the NIR imaging lens assembly is N, the lens element with refractive power made of a substantially visible-light-absorbable material has an average transmittance percentage of TA_S for light in the wavelength range of 400 to 600 nm and TA_L for light in the wavelength range of 900 to 1050 nm, half of the maximum field of view of the NIR imaging lens assembly is HFOV, a maximum angle of incidence of a chief ray on an electronic photo sensor of the NIR imaging lens assembly is CRA, and satisfy the following relations:

$N \geq 2$, $TA\_S < 20\%$, $TA\_L > 60\%$, and $1.0 < HFOV/CRA < 12.0$.

13. The NIR imaging lens assembly according to claim 12, wherein the lens element with refractive power made of a substantially visible-light-absorbable material is made of plastic.

14. The NIR imaging lens assembly according to claim 13, wherein the NIR imaging lens assembly comprises at least an aspheric lens element.

15. The NIR imaging lens assembly according to claim 12, wherein the transmittance spectrum of the NIR imaging lens assembly has a peak, a corresponding center wavelength of the peak is CW, a corresponding maximum transmittance percentage of the peak is MT, and CW and MT satisfy the following relations:

780 nm<CW<900 nm, and

MT>50%.

16. The NIR imaging lens assembly according to claim 12, wherein the transmittance spectrum of the NIR imaging lens assembly has a peak, a corresponding full width at half maximum of the peak is FWHM, a corresponding maximum transmittance percentage of the peak is MT, and FWHM and MT satisfy the following relations:

3 nm<FWHM<25 nm, and

MT>50%.

17. The NIR imaging lens assembly according to claim 12, wherein an electronic photo sensor on an image plane is provided for image formation of an object, a total track length of the NIR imaging lens assembly is TTL, a maximum image height of the NIR imaging lens assembly is ImgH, and TTL and ImgH satisfy the following relation:

TTL/ImgH<5.0.

18. The NIR imaging lens assembly according to claim 12, wherein the NIR imaging lens assembly is a retrofocus lens system, and the lens element having refractive power and being closest to an imaged object has negative refractive power.

* * * * *